(No Model.)
P. BOYLAN.
POTATO DIGGING MACHINE.
No. 419,495. Patented Jan. 14, 1890.
Fig. 1.
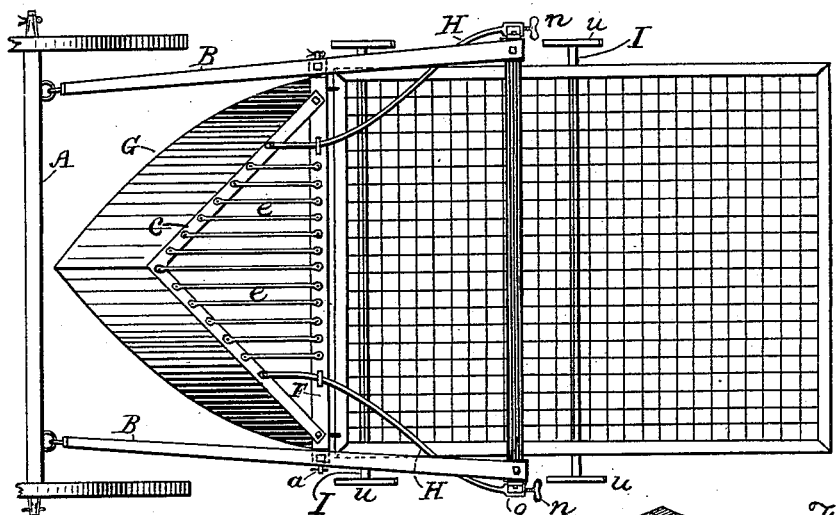
Fig. 3.
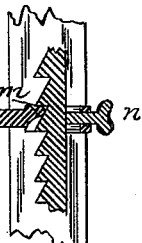
Fig. 4.
Fig. 2.
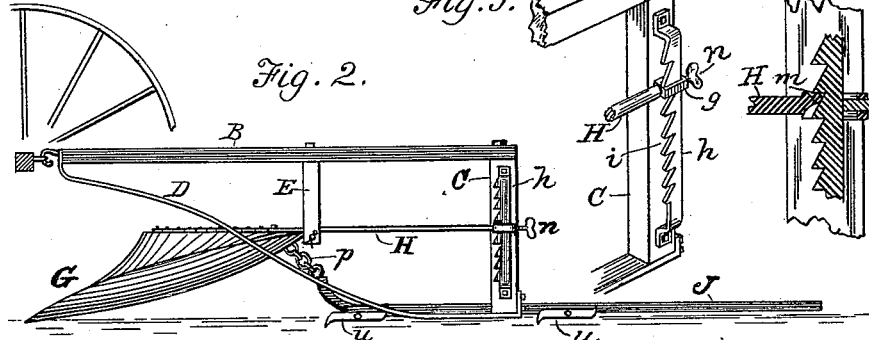
Fig. 5.
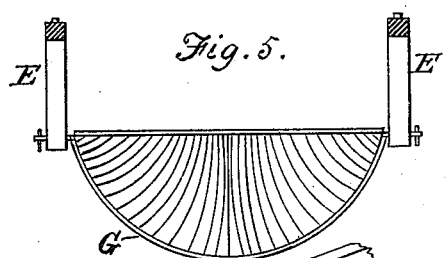
Fig. 6.
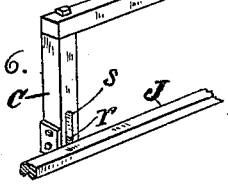
Witnesses:
W. Burris
G. Burroughs
Inventor:
Patrick Boylan
By G. B. Towle
Attorney

UNITED STATES PATENT OFFICE.

PATRICK BOYLAN, OF MOSSVILLE, ILLINOIS.

POTATO-DIGGING MACHINE.

SPECIFICATION forming part of Letters Patent No. 419,495, dated January 14, 1890.

Application filed June 15, 1889. Serial No. 314,407. (No model.)

*To all whom it may concern:*

Be it known that I, PATRICK BOYLAN, a citizen of the United States, residing at Mossville, in the county of Peoria and State of Illinois, have invented certain new and useful Improvements in Potato-Digging Machines; and I do hereby declare the following to be a full, clear, and exact description of the invention, such as will enable others skilled in the art to which it appertains to make and use the same.

This invention relates to potato-diggers; and it consists in certain improvements in the construction of the same, as hereinafter described and claimed.

In the accompanying drawings, Figure 1 represents a plan view of a potato-digger provided with my improvements. Fig. 2 is a side view of the same. Figs. 3 and 4 illustrate the device for adjusting the shovel or scoop in position. Fig. 5 is a front view of the pivoted shovel. Fig. 6 is a detail view of certain parts.

The machine when used is usually attached to a wheeled vehicle to be drawn forward, and is shown in the drawings as connected with the axle A of an ordinary vehicle by means of the draft-poles or shafts B, which extend rearward, as shown. The rear ends of said shafts are bolted or otherwise fastened to the tops of the upright pieces C, and to the lower ends of said uprights are fastened the rearward ends of the metal strips D, which extend forward, being bent somewhat upward and made fast to the forward ends of the shafts B, as seen in Fig. 2. The strips D serve as ground-runners for the machine, which is drawn forward after the manner of a sled.

E indicates two hangers, which are pendent from the shafts B, to which the hangers are made fast.

F indicates a bar which extends across the machine, the ends of said bar being formed or provided with bolts or pins, which extend through apertures in the hangers E near the lower ends of said hangers, and are secured by pins or keys *a*.

The shovel G is fastened to the pivoted bar F, and is thus pivotally connected with the hangers E, so that it may be adjusted in elevation, as hereinafter stated. The shovel extends forward and downward, being pointed in front and curved somewhat after the style of a scoop-shovel, so that it enters the ground and gathers the potatoes and the soil about them as it is drawn forward. At its upper edge the shovel is bent to form a flange *c*, to which is fastened a series of rods *e*, which extend to the bar F, to which the rods are also made fast.

H indicates two curved rods, the forward ends of which are firmly secured to the flange *c* of the shovel and to the bar F, being bolted thereto. The rearward ends of the rods H are provided with loops *g*, by which they are connected with the metal straps *h*, which are provided with teeth *i* and are fastened at their extremities to the uprights C. The loop *g* of each rod H is formed with an inner bearing-point *m*, which is somewhat rounded for connection with the teeth *i*, (see Fig. 4,) so that when there is any swaying of the rods H as the machine moves along the rounded point moves freely in a notch between two of the teeth and the bearing parts are not injured or affected. The rods may be adjusted on the straps *h* at any desired points, and may be secured by the set-screws *n*, and thus the shovel may be set at any desired angle of elevation. The screws *n* being loosened, the rods may be raised or lowered, the points *m* passing readily over the teeth *i*.

J indicates a sieve or screen, which rests on the ground and extends rearward from the shovel, as shown. The front end of the sieve is turned up to facilitate its passage when drawn over rough ground, and also to prevent surplus earth passing onto it. The said sieve may be connected with the shovel by draft-chains, as seen at *p*. In order to keep the sieve in proper position lengthwise, and also to relieve the shovel and chains to some extent of the strain caused by the weight of the sieve and its contents, the said sieve is loosely connected with the uprights C by bolts or fixed pins *r*, which extend from the frame of the sieve into slots *s*, which are formed in the inner sides and at the lower ends of said uprights, as seen in Fig. 6, the said pins having vertical play in the slots.

The rods I extend across under the sieve J and are rigidly attached thereto, and to the extremities of said rods are pivotally secured the catches $u$, the ends of which are pointed, the points being bent in opposite directions, so that the forward points will catch in the surface of the ground, and thus make the catches rotate or turn over as the machine is drawn forward.

In operation, the shafts B being hooked to the axle of a vehicle and the shovel being adjusted at the proper inclination for digging, the machine is drawn forward, the shovel enters the ground, taking the potatoes and the soil about them, the mass being pushed up onto the rods $e$, and from thence falling on the sieve J, the soil being thus broken. The forward points of the catches $u$ enter the ground, and the catches are thus made to turn over on their pivots, causing the sieve to rise and fall and shake the loose earth therefrom.

I claim—

1. In a potato-digging machine, a pair of shafts provided with hangers E, two upright pieces to which said shafts are fastened, a pair of runners connected with the forward parts of the shafts and with the lower ends of said upright pieces, a shovel pivoted to said hangers, and a sieve adapted to rest on the ground and extending rearward from the said shovel, substantially as and for the purposes described.

2. The combination, with the shovel and cross-bar provided with rods $e$ and pivoted to suitable supports, of the rods H, provided with loops at their extremities, adjusting-screws, and vertical toothed straps $h$, provided with vertical supports, substantially as set forth and described.

3. The shovel and pivoted cross bar, in combination with rods H, provided with loops $g$, which are provided with bearing-points $m$, screws $n$, and the vertical toothed straps $h$, provided with supports, substantially as set forth and described.

4. The combination, with the shovel, of the sieve connected therewith and provided with fixed pins extending from its sides, and the fixed vertical pieces provided with slots $s$, into which the said pins extend, substantially as and for the purposes described.

In testimony whereof I have affixed my signature in presence of two witnesses.

PATRICK BOYLAN.

Witnesses:
L. M. THURLOW,
ARTHUR KEITHLEY.